3,035,676
CLUTCH ACTUATING MECHANISM
Friedrich K. H. Nallinger, Stuttgart, Germany, assignor to Daimler-Benz Aktiengesellschaft, Stuttgart-Unterturkheim, Germany
Filed Feb. 26, 1958, Ser. No. 717,771
Claims priority, application Germany Feb. 28, 1957
7 Claims. (Cl. 192—.096)

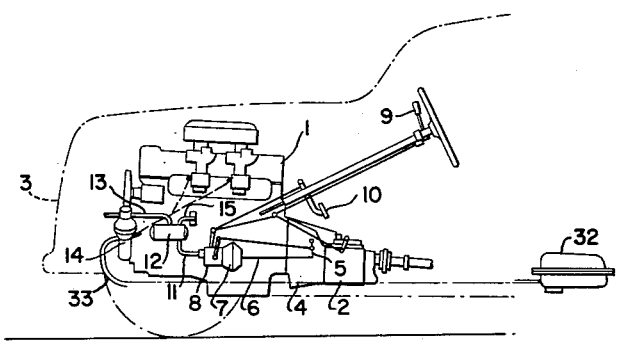
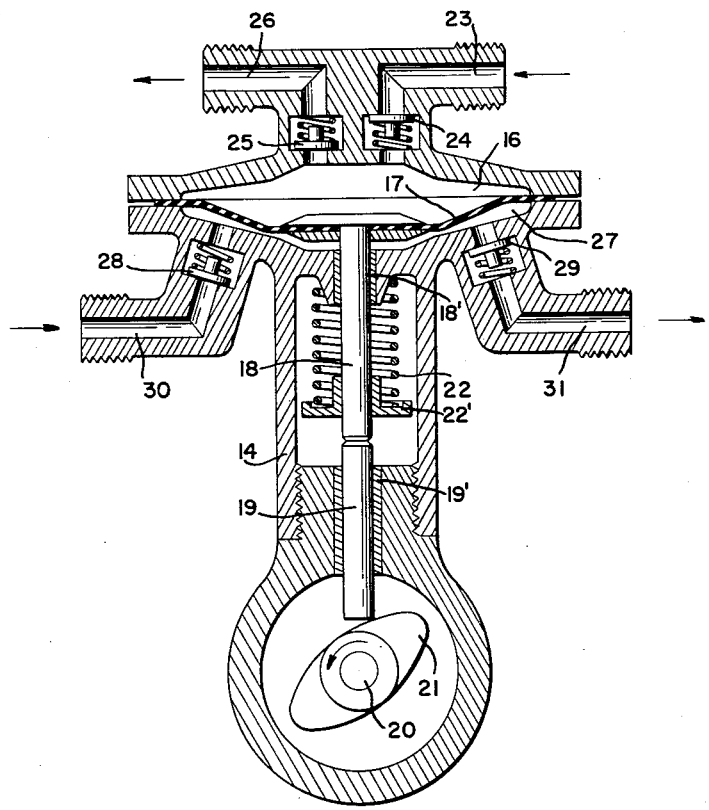

The present invention relates to a motor vehicle with a clutch arrangement between the motor and the gear transmission which consists, for instance, of a hydraulic clutch and a mechanically diengageable clutch arranged behind the hydraulic clutch wherein the mechanical clutch is operated by a servo motor that is responsive to a vacuum.

Up to now, the operation of the servomotor has been accomplished by a vacuum produced in the intake manifold of the engine. In order to be advantageously independent from the ability of the engine, that is, its capability of producing a vacuum in the suction manifold and to be independent of kinomatic influences which, in the suction manifold of an Otto engine at high altitudes and above all in cold weather on account of a drop in the idling speed of the engine, are not expected to produce a vacuum sufficient for the operation of the servomotor, it is inventively proposed that the vacuum for the servomotor is produced by a vacuum pump formed, for instance, as a membrane pump advantageously directly mechanically driven by the motor of the vehicle.

It is an object of this invention to provide an improved arrangement of hydraulic and mechanical clutch means between the engine and transmission of a motor vehicle.

Another object of this invention is to provide improved clutch actuating means driven directly by the vehicle motor.

Still another object of this invention is to provide a clutch actuating mechanism for a vehicle of the above type wherein the mechanism operates independently of reduced pressure or vacuum created from a suction manifold.

A further object of this invention is to provide means for actuating a motor vehicle clutch with improved performance in a wide range of altitudes and temperatures.

Another object of this invention is to provide a simplified structure for a clutch actuating mechanism, more particularly a simplified structure combining vacuum producing and fuel delivery pumps wherein the vacuum producing pump activates a clutch mechanism.

Another object of this invention is to provide improved means for driving a clutch operating mechanism from a motor vehicle motor by means of a vacuum and for further reducing the load on the vehicle motor when an adequate degree of vacuum is maintained to activate the clutch mechanism.

In the further development of the inventive idea, control means such as valves or the like may be arranged advantageously in the drive of the vacuum pump which automatically switch on the drive of the vacuum pump if the vacuum necessary for the operation of the clutch falls below a permissible and predetermined measure.

In order to obtain the structural simplification, the vacuum pump may be advantageously combined with the fuel supply pump, for instance, in such a manner that with a membrane pump one of the pump chambers subdivided by the membrane serves for producing the vacuum, while the other pump chamber serves for delivery of the fuel.

Finally, the arrangement can be made such that from the vacuum pump, that is, from a vacuum tank connected to this pump, other drive motors for auxiliary drives at the motor vehicle may be supplied besides the servomotor for the operation of the clutch.

These and other objects, features and advantages of the present invention will become more obvious from the following description when taken in connection with the accompanying drawing, which shows, for purposes of illustration only, one embodiment in accordance with the present invention, and wherein:

FIGURE 1 shows schematically a longitudinal section through the motor vehicle, the clutch of which is operated by a servomotor responsive to a vacuum whereby the vacuum is produced by a vacuum pump, and FIGURE 2 shows a cross section through the vacuum pump.

Between an internal combustion engine 1 and a transmission 2, a clutch arrangement 4 is provided in a motor vehicle 3 which consists of a hydraulic clutch and a mechanically separating clutch arranged behind the first. A disengaging lever 5 of the separating clutch is connected with a clutch-actuating servomotor 7 by means of an operating rod 6. A control device 8 of the servomotor is actuated, preferably electrically, through operation of the transmission shift lever 9, to coordinate shifting and clutch operation, and can be influenced also by a foot pedal 10 so that the servomotor 7 which actuates the disengaging lever 5 is operated by vacuum through line 11 from a vacuum tank 12 which is in turn connected through line 13 to a vacuum pump 14, driven by the engine. At the vacuum tank 12, a further line 15 is provided to which may be connected other driving units or motors for auxiliary drives arranged in the vehicle.

As can be seen from FIGURE 2, the vacuum pump 14 consists essentially of a displaceable membrane 17 for effecting pumping action and arranged within a pump chamber 16 wherein it is moved up by push rods 18 and 19, in an axial direction thereof, by a cam 21 on a motor-driven cam shaft 20 and returned downwardly by a spring 22 abutting against collar 22′ which is secured to rod 18. By this downward movement, air is drawn into chamber 16 through valve 24 by way of a pump connection 23 connected with the vacuum tank 12 through line 13 (FIGURE 1) and by upward movement of membrane 17 air is discharged from chamber 16 into the atmosphere through valve 25 of the pipe connection 26.

The rods 18 and 19 have bearing means including sleeves 18′ and 19′, respectively, guiding the rods in their movements.

In practicing the present invention, the pump chamber 27, on the side of membrane 17 opposite chamber 16, may, in one instance, be vented to atmosphere through the valves 28 and 29 or, in another instance, the inlet and outlet connections 30 and 31 for chamber 27 may be connected, respectively, with suitable fuel reservoir means 32 by means of line 33 and used for supplying fuel to the vehicle engine 1. Thus, the displacement of membrane by cam 21 and spring 22 may serve to pump fuel through the chamber 27 in a manner similar to the pumping of air through chamber 16.

When the chamber 27 is vented to atmosphere, the pressure in chamber 16 during downward or return movement of push rod 18 is dependent on the degree of vacuum in tank 12 and, when the fluid pressure differential between opposite sides of the membrane is sufficient to hold spring 22 in compression, the push rod 18 together with the membrane 17 is held in a certain position against the pressure of the spring 22 in which the push rod 18 does no longer perform the full stroke of the push rod 19. With a large vacuum or very low pressure in the vacuum tank and substantially atmospheric pressure in chamber 27, the push rod 18 is held close to the valves 24, 25 by the membrane 17 so that the push rod 19 only performs idling strokes produced by the cam 21 without actuating the push rod 18 and the membrane 17 for pump movements. By a sufficient vacuum, the vacuum pump is therefore made inactive and the idling strokes of the push rod 19 do, for all practical purposes, not constitute a loss of power. Of course, when the pump is connected to operate both as a vacuum pump and a fuel pump, the spring 22 should be of such strength to return the membrane to the position shown in FIGURE 2 for each downward stroke of the push rod 19, regardless of the degree of vacuum in the upper chamber 16 so that fuel may be pumped continuously.

While I have shown and described one preferred embodiment in accordance with the present invention, it is understood that the same is not limited thereto but is susceptible of many changes and modifications within the spirit of the present invention, and I therefore intend to cover all such changes and modifications as encompassed by the appended claims.

I claim:

1. A motor vehicle with means for supplying fuel to the vehicle motor and an auxiliary vacuum-operated motor, a combination vacuum pump and fuel pump having two chambers separated by a displaceable diaphragm, means for connecting the pump chambers to said fuel supply means and said vacuum system for said vacuum-operated motor, respectively, and means driven directly by the vehicle motor for reciprocating said diaphragm for simultaneously pumping fuel and producing a vacuum.

2. In a motor vehicle, a mechanically disengageable clutch between the vehicle motor and a transmission, a vacuum-operated servo motor for actuating said clutch, means for supplying fuel to the vehicle motor, a pump driven directly by the vehicle motor and having two pump chambers separated by a displaceable diaphragm, means for connecting said diaphragm for displacement by the vehicle motor, and first connecting means for connecting one of said chambers in said fuel supply means and second connecting means for operatively connecting the other of said chambers with said servo motor, whereby said pump may act simultaneously to pump fuel and produce a vacuum for actuating said servo motor.

3. In a motor vehicle, a vacuum system including at least one vacuum-driven servo motor for operating at least one vehicle accessory, a pump driven directly by the vehicle motor having a displaceable diaphragm therein, a first chamber on one side of said diaphragm, a second chamber on the other side of said diaphragm, said chambers being partially defined by said diaphragm, means operatively connecting said diaphragm for displacement by said vehicle motor including a first push rod connected to said diaphragm on said one side thereof, a second push rod operatively connected to said vehicle motor for displacement thereby and abutting said first push rod in driving engagement therewith, and a spring attached to said first push rod on said one side of said diaphragm in such a manner that the first push rod is normally held in driving engagement with said second push rod, and connecting means for connecting said second chamber to said vacuum system, whereby said pump acts to reduce the pressure in said vacuum system.

4. In a motor vehicle as defined in claim 3, separate bearing means for each push rod including guide means for maintaining said push rods in alignment, a chamber formed between said bearing means, said push rods extending into said chamber, said spring being attached to the portion of said first push rod that extends into said chamber.

5. In a motor vehicle as defined in claim 4, wherein said vehicle includes a mechanically disengageable clutch between the vehicle motor and a transmission, and said servo motor actuates said clutch.

6. In a motor vehicle as defined in claim 3, means for supplying fuel to the vehicle motor, second connecting means for connecting said first chamber in said fuel supply means, whereby said pump acts simultaneously to pump fuel and to reduce the pressure in the vacuum system.

7. In a motor vehicle as defined in claim 3, second connecting means for connecting said first chamber to the atmosphere whereby said spring serves as a control means for automatically controlling the operation of the vacuum pump by controlling the engagement of the two push rods, to provide a predetermined vacuum in the vacuum system controlled by the ratio of the vacuum in the second chamber and the compressive strength of said spring.

References Cited in the file of this patent

UNITED STATES PATENTS

| | | |
|---|---|---|
| 1,857,675 | Babitch | May 10, 1932 |
| 2,018,111 | Babitch et al. | Oct. 22, 1935 |
| 2,104,447 | Babitch et al. | Jan. 7, 1938 |
| 2,189,526 | Babitch | Feb. 6, 1940 |
| 2,598,184 | Long | May 27, 1952 |
| 2,798,662 | Evans | July 9, 1957 |

FOREIGN PATENTS

| | | |
|---|---|---|
| 403,817 | Great Britain | Jan. 4, 1934 |